United States Patent [19]

Kane

[11] Patent Number: 4,800,944

[45] Date of Patent: Jan. 31, 1989

[54] SINGLE BEAD TIRE MOUNTER

[75] Inventor: John P. Kane, Sterling Heights, Mich.

[73] Assignee: Allied Automation Systems, Inc., Detroit, Mich.

[21] Appl. No.: 12,427

[22] Filed: Feb. 9, 1987

[51] Int. Cl.$^4$ .............................................. B60C 25/10
[52] U.S. Cl. ................................................... 157/1.22
[58] Field of Search ..................... 157/1.1, 1.17, 1.22, 157/1.24, 1.26, 1.28, 1.2

[56] References Cited

U.S. PATENT DOCUMENTS

| | | | |
|---|---|---|---|
| 1,587,634 | 6/1926 | Dickey et al. | 157/1.22 |
| 2,665,747 | 1/1954 | Harrison | 157/1.24 X |
| 2,900,018 | 8/1959 | Harrison | 157/1.24 |
| 2,934,137 | 4/1960 | Lewis | 157/1.24 |
| 3,050,110 | 8/1962 | Lydle | 157/1.24 |
| 3,489,198 | 1/1970 | Malinski | 157/1.17 |
| 3,545,463 | 12/1970 | Mueller | 157/1.24 |
| 4,163,468 | 8/1979 | Mueller | 157/1.17 |
| 4,196,766 | 4/1980 | Leeper et al. | 157/1.26 |
| 4,403,640 | 9/1983 | Schifferly | 157/1.3 |
| 4,621,671 | 11/1986 | Kane et al. | 157/1.24 X |

FOREIGN PATENT DOCUMENTS

| | | | |
|---|---|---|---|
| 2829936 | 1/1980 | Fed. Rep. of Germany | 157/1.26 |
| 1143618 | 3/1985 | U.S.S.R. | 157/1.24 |

*Primary Examiner*—Debra Meislin
*Attorney, Agent, or Firm*—Basile and Hanlon

[57] ABSTRACT

A horizontally disposed vehicle wheel having a tubeless tire resting upon the wheel in a forwardly offset inclined position is located beneath a work head which is then lowered to an operating position at a fixed distance above the wheel. A radially extensible arm is mounted for rotary oscillation below the head about an axis coaxial with that of the located wheel and carries at its outer end a set of rollers which, upon rotation of the arm in one direction will engage the lowermost bead of the tire where located above the upper rim of the wheel and progressively face the engaged bead radially outwardly beyond the rim and downwardly below the rim to mount the lower bead only on the wheel.

The apparatus self adjusts itself to wheels of different diameters and axial widths.

8 Claims, 4 Drawing Sheets

SINGLE BEAD TIRE MOUNTER

BACKGROUND OF THE INVENTION

The present invention is directed to apparatus designed to mount tubeless tires on automotive vehicle wheels in a production line environment. Such machines are employed in vehicle assembly plants and must be capable of operation at a production rate which will supply sufficient assembled wheels and tires at a rate dictated by the speed of the vehicle production line.

In a typical tire-wheel assembly line, the wheels are mounted on a pallet conveyor which advances the wheels in step by step movement through a series of work stations. At a point on this conveyor line upstream from the tire mounter, a tire is rolled onto each pallet from one side of the conveyor into a position on the pallet immediately in front of the wheel. The tire arrives on the pallet in a vertical position and is subsequently knocked backwardly into a rearwardly inclined position on the wheel in which the lower bead of the tire rests on two circumferentially spaced points on the uppermost rim flange of the horizontally positioned wheel.

In a typical prior art mounting operation, the wheel and tire are then advanced beneath a horizontal roller which extends transversely of the conveyor above the level of the uppermost rim flange of the wheel. This roller forces the beads of the tire downwardly below the rim flange as the wheel and tire pass beneath the roller.

This brute force approach results in an intense abrasive action on the beads. The normal diameter of the opening defined by the beads must be smaller than the outer diameter of the rim flange and hence the beads are violently distorted and subject to substantial frictional forces as they are pressed downwardly to pass the rim flange. The problem is particularly acute in the case of relatively wide tread low profile tires.

In an effort to address this problem, it has been proposed, see U.S. Pat. No. 4,621,671, to mount only one bead of the tire on the wheel at a time. In the apparatus of U.S. Pat. No. 4,621,671, the lowermost bead of the tire is forced over the rim flange at a first work station and the uppermost bead is then forced onto the wheel at a subsequent work station. In this apparatus, during the mounting of the lowermost bead, the upper bead acts as a cushioned force transmitting element between the roller and lower bead and is able to transmit this force efficiently because the upper bead is not engaged with or restrained by the rim flange during the mounting of the lower bead.

While the single bead mounting procedure employed in the apparatus of U.S. Pat. No. 4,621,671 represents a substantial improvement over the prior art practice of forcing both beads onto the rim at the same time, it has not completely eliminated the adverse effects generated by the forcing of a bead of a first diameter downwardly over a rim of larger diameter.

The present invention is directed to a solution to this problem in which a single bead mounting approach is applied in a manner which minimizes stretching of the tire bead being mounted and frictional forces exerted between the wheel rim and bead during the mounting operation.

SUMMARY OF THE INVENTION

In accordance with the present invention, a wheel is advanced on a conventional pallet conveyor to a single bead mounting station with the tire resting upon the wheel in a conventional rearwardly inclined or slant position. At the mounting station, the wheel is located with its ais coaxial with the vertical axis of rotation of an arm mounted upon a work head which, upon arrival of the wheel at the work station is lowered from an elevated rest position to an operating position at which the head is at a predetermined distance above the wheel. The rotary arm of the mounter is radially telescopic and carries at its outer end a group of rollers. One of these rollers is rotatable about a vertical axis and is located to engage the outer periphery of the uppermost rim flange of the wheel when the head is in its operating position. The outer end of the arm is spring biassed radially inwardly so that this roller can adjust itself to wheels of different diameter.

A second roller on the arm is likewise mounted for rotation about a vertical axis and is disposed at an elevation slightly above the upper rim flange of the wheel when the head is in the operating position. This second roller projects slightly outwardly beyond the periphery of the wheel rim and, upon rotation of the arm about its axis, will engage those portions of the lower bead of the tire which are above the rim and progressively force the engaged bead outwardly slightly beyond the periphery of the rim.

A third roller at the outer end of the arm is mounted for rotation about a horizontal axis and is of a diameter large enough to engage the inner side of the tire sidewall and to force this sidewall downwardly so that the adjacent portion of the lower bead is forced downwardly below the upper rim flange. This third roller is located slightly behind the second roller with respect to the direction of rotation of the arm during the mounting stroke so that, upon rotation of the arm, the lowermost bead of the tire which projects above the rim is progressively forced radially outwardly to clear the rim and then downwardly below the rim into the mounted position.

By operating effectively only on one point of the lower bead at a time (as opposed to the roller technique in which the bead is forced over the rim at two points at the same time) the lower bead of the tire which is below the rim can shift inwardly of the wheel to minimize the stretching necessary to force a single point on the bead radially outwardly of the tire. In the arrangement described, the bead is not forceably engaged by the periphery of the rim as it passes downwardly below the rim.

The arm is normally disposed in a home position in which the arm extends radially from its axis of rotation forwardly above the conveyor center line with respect to the direction of movement of the wheel. When in this position, a guard finger fixedly mounted on the work head is disposed immediately in front of the outer end of the arm and, upon lowering of the head, this guard finger is inserted between the upper bead of the tire and the uppermost wheel rim. In the mounting operation, the arm is rotated, approximately 330 degrees from its home position and then rotated in the reverse direction to return to the home position. A the arm approaches its home position, a fourth roller at the outer end of the head moves into engagement with a cam mounted on the head which radially extends the arm to its maximum radial extension as the arm arrives at its home position. This maximum extension is selected to locate the first or rim engaging roller at the outer end of the arm at a radial distance from its axis of rotation sufficient to accommodate the largest diameter wheel which will be encountered. Variations and axial width of wheels fed to the apparatus are accommodated by a locating device mounted on the head to engage the wheel upon lowering movement of the head to establish the operating position of the head relative to the wheel.

Other objects and features of the invention will become apparent by reference to the following specification and to the drawings.

IN THE DRAWINGS

Figure 1:
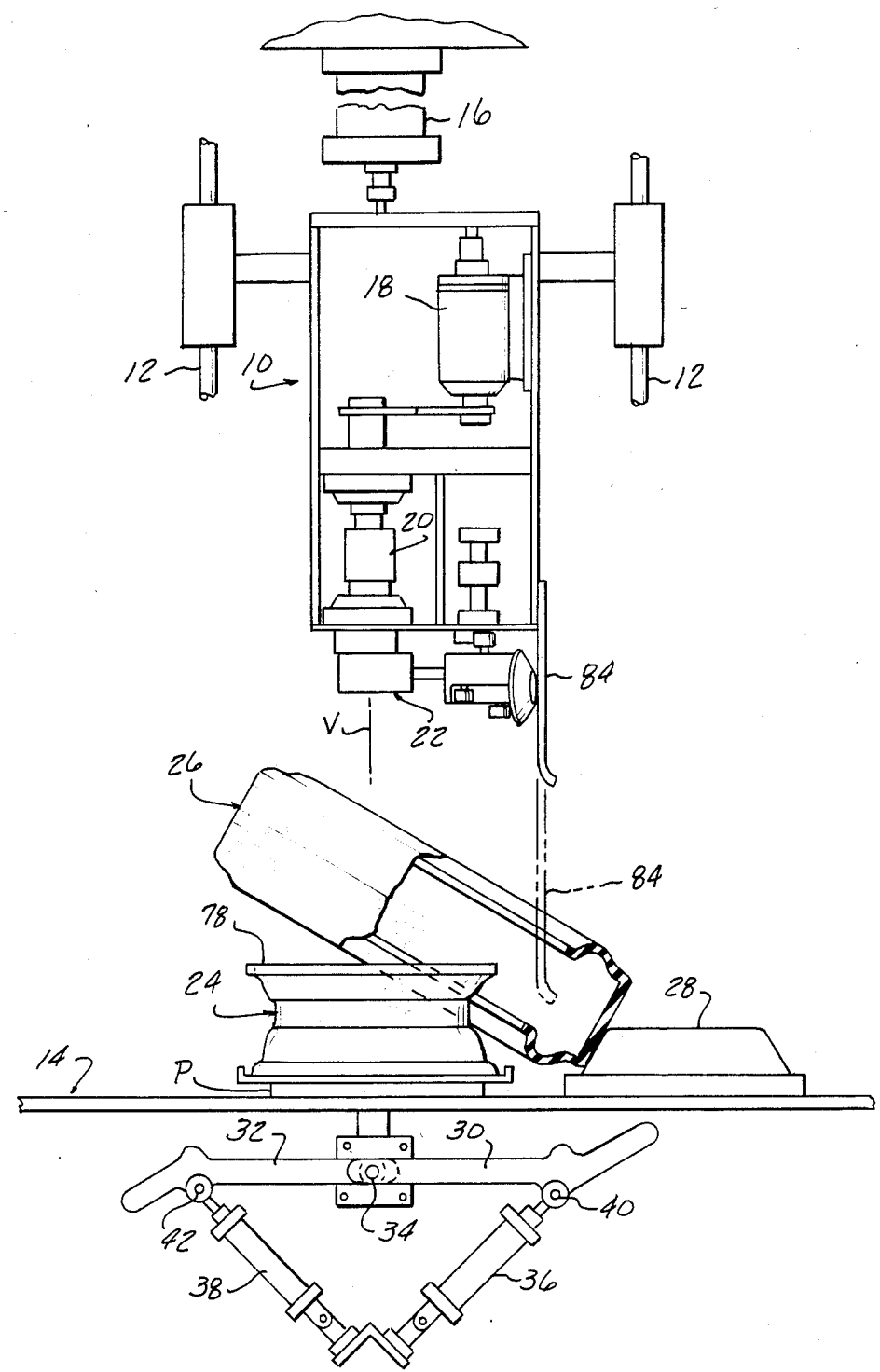
FIG. 1 is a side elevational view of an apparatus embodying the present invention, with certain parts broken away or omitted.

Referring now to FIG. 1, a single bead mounter embodying the present invention includes a work head designated generally 10 mounted for vertical movement guided by fixed vertically extending guiderods 12 above a pallet conveyor designated generally 14 of conventional construction which is driven in intermittant movement from left to right as viewed in FIG. 1. Work head 10 is driven in vertical movement from and to its normally maintained elevated rest position shown in FIG. 1 by a pneumatic motor partially indicated at 16 whose cylinder is mounted on the fixed frame.

Work head 10 carries a reversible rotary drive motor 18 which is coupled through a suitable transmission designated generally 20 to drive a horizontally extending arm assembly 22 in rotary movement about a fixed vertical axis indicated at V.

As previously stated, pallet conveyor 14 is of conventional, well known construction and carries a plurality of spaced pallets P which in turn carry a vehicle wheel designated generally 24. At some point on convey 14 upstream from the portion of the conveyor shown in FIG. 1, a tubeless tire 26 is rested in the inclined position shown in FIG. 1 upon the wheel, the forward portion of the tire resting upon a seat 28 mounted on the conveyor. Conveyor 14 is driven in step by step movement to advance the pallets P to a series of work stations, one of which is illustrated in FIG. 1, and to stop the pallet at each work station for a predetermined time period between successive steps of movement, which time period is employed to perform a work operation on the wheel and tire supported upon the pallet. Work head 10 is located above conveyor 14 at a positions such that the vertical axis of rotation of arm assembly 22 will intersect the center line of the conveyor and will also be coaxial with the axis of wheel 24 the conveyor is stationary between intermittent steps of movement.

At either side of conveyor 14, a pair of tire positioning arms 30, 32 are mounted for pivotal movement about a horizontal pivotal axis defined by pivot pins 34. Arms 30, 32 are driven in pivotal movement between the rest position shown in FIG. 1 and the actuated position shown in FIG. 3 by air cylinders 36, 38 respectively whose cylinders are pivotally connected to the fixed frame and whose piston rods are pivotally connected to the respective arms as at 40, 42.

Figure 4:
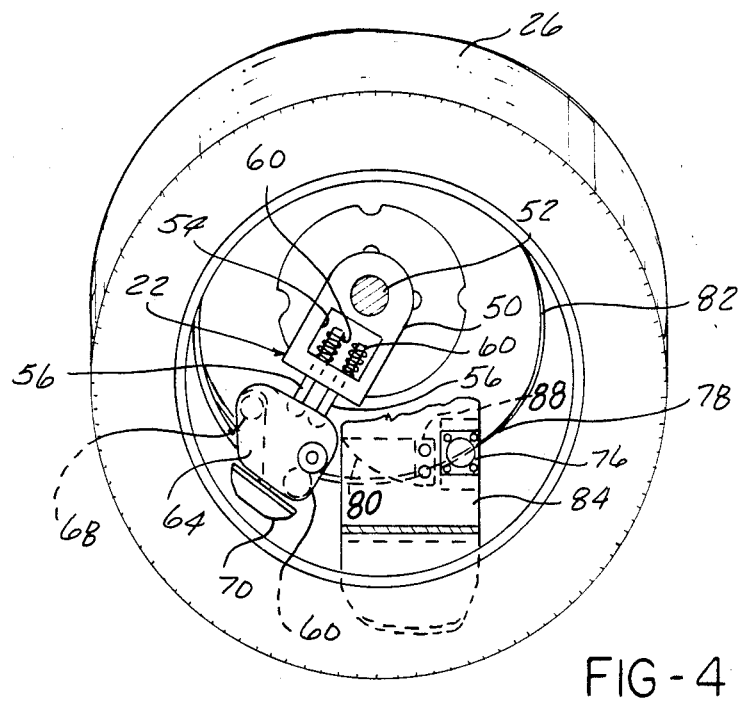
FIG. 4 is a top plan view, with certain parts omitted, broken away or shown in section of the mounting arm in operative relationship with a wheel and tire.
Figure 5:
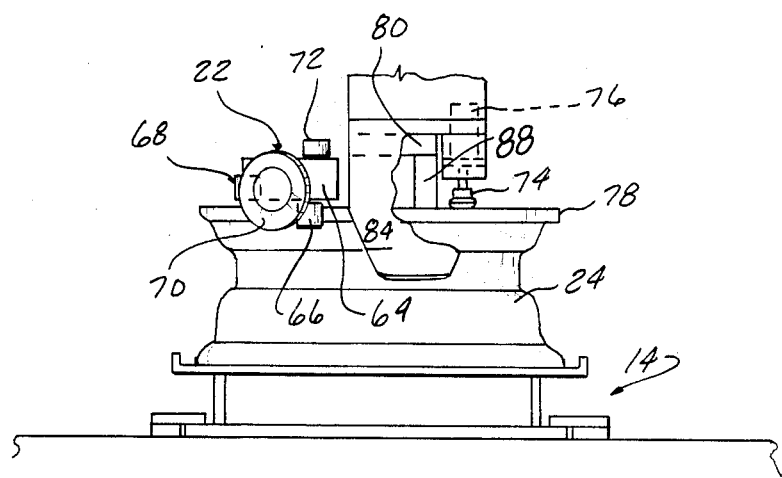
FIG. 5 is a front elevational view showing details of the roller assembly and guard finger, with the tire omitted.
Figure 6:
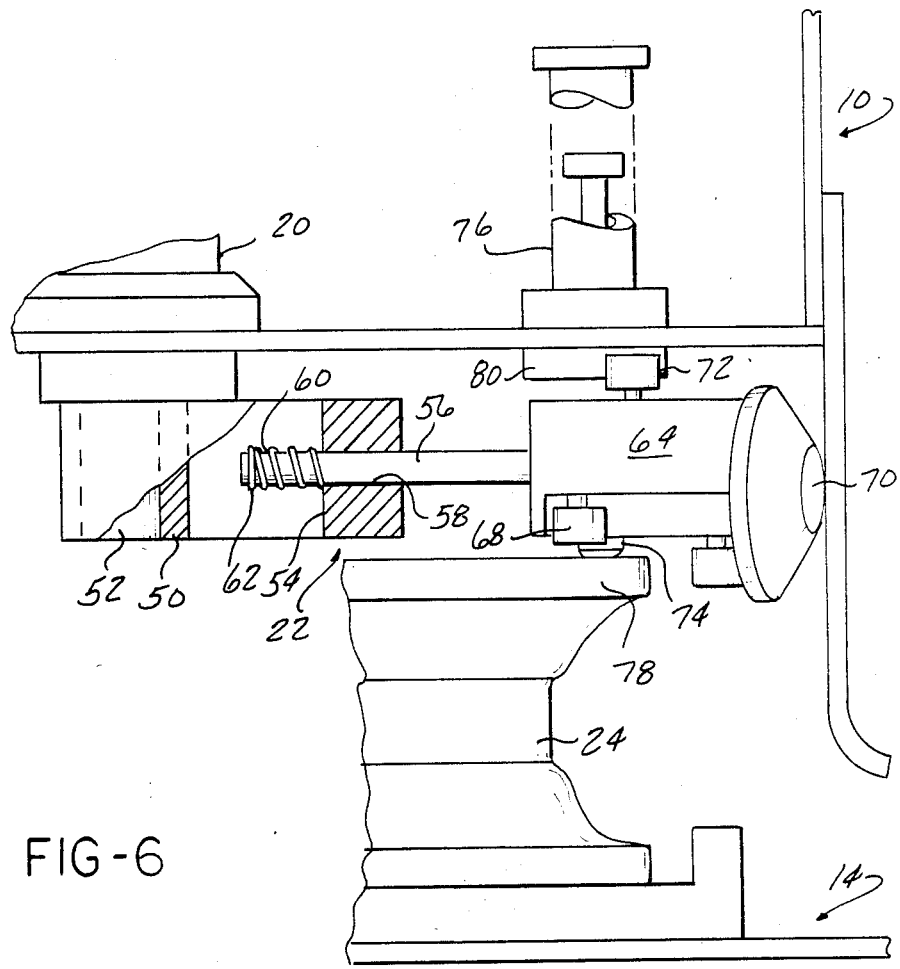
FIG. 6 is a side elevational view of the arm and roller assembly in operative relationship with a wheel with the tire omitted.

The construction of arm assembly 22 is best seen in FIGS. 4–6. Referring first particularly to FIGS. 4 and 6, arm assembly 22 includes an inner arm section 50 which is fixedly secured to the lower end of the output shaft 52 of the rotary drive transmission 20. A generally rectangular vertical opening 54 is cut through inner arm section 50 and a pair of rods 56 are slidably received in bores 58 formed in the outer end portion of inner arm section 50. Compression springs 60 are engaged between the radially outer side of opening 54 and a flange-like abutment 62 on each rod 56 to resiliently bias rods 56 radially inwardly of arm section 50.

Figure 7:
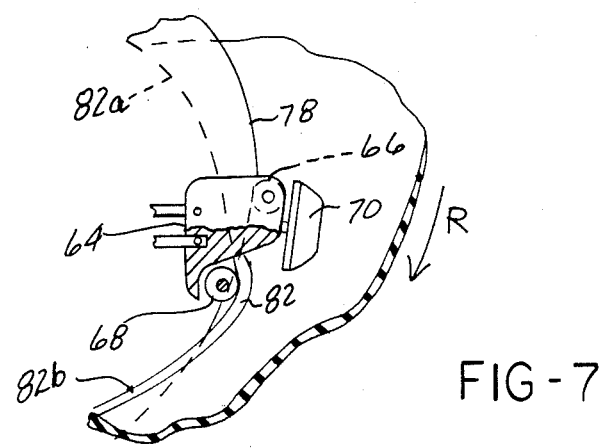
FIG. 7 is a top plan view with certain parts omitted, broken away, or shown in section showing the bead mounting operation.

A roller mounting block 64 is fixedly secured to the respective outer ends of rods 56 and is supported by the rods upon inner arm section 50 for movement radially toward and away from the axis of shaft 52. Roller mounting block 64 carries four rollers mounted for free rotation relative to the block and identified as rim roller 66, bead roller 68, presser roller 70 and cam roller 72. The functions of these rollers is best shown in FIGS. 6 and 7.

In FIGS. 4 and 5, arm 22 is shown rotatively displaced from its normally maintained rest or home position. The home position of arm 22, with reference to FIG. 4, would be with the arm at a 6 o'clock position relative to the axis of shaft 52, in which the radial extent arm 22 from shaft 52 would overlie the center line of conveyor 14 and project from shaft 52 in the forward direction of movement of the conveyor. When head 10 is in its elevated rest position shown in FIG. 1, arm 22 is in its home position.

In FIG. 6, arm 22 is shown in its home position with head 10 located in its lowered operating position which is determined by the engagement of the probe 74 of a shock absorber type locator 76 mounted on work head 10 (see FIGS. 4, 5 and 6) with the uppermost rim flange 78 of wheel 24. The probe 74 is mounted on the lower end of a piston rod whose piston is received within the casing of the cylindrical shock absorber 76.

With the arm 22 at its home position, cam roller 72 is engaged with a cam 80 fixedly mounted on the underside of the work head 10 to hold roller mounting block 64 at its maximum radial extension from the axis of shaft 52. The curved configuration of cam 80 is shown in FIG. 4.

Referring now to FIG. 6, it will be seen that with arm 22 in its home position and work head 10 in its operating position, rim roller 66 is positioned in horizontal alignment with the uppermost rim flange 78 of the wheel and is spaced slightly forwardly (to the right as shown in FIG. 6) from rim flange 78. This clearance assures that with the arm 22 in its home position, when work head 10 is lowered, roller 66 will clear the uppermost rim flange 78 of a wheel of the largest diameter to be presented to the apparatus. With the head in its lowered position, bead roller 68 is at an elevation slightly above the uppermost rim flange 78 of the wheel.

Referring briefly to FIG. 4, it is seen that the configuration of cam 80 is such that upon clockwise rottion of arm 22 from its 6 o'clock home position, cam surface 80 will permit roller mounting block 64 to move radially inwardly toward inner arm section 50 under the action of springs 60.

Referring now to FIGS. 6 and 7, this radial inner movement of mounting block 64 as cam roller 72 is permitted to move inwardly by cam 80, will continue until roller 66 is moved into contact with the periphery of upper rim flange 78. Thus, the arm accommodates itself to wheels of different diameters falling with in a reasonable range of diameters. Variations in axial width of wheels presented to the apparatus is automatically accommodated by the locator 76.

With rim roller 66 engaged with the uppermost rim flange 78 of the wheel, rotation of arm 22 will carry roller mounting block 64 around the periphery of wheel 24 with mounting block 64 and its various rollers held in a fixed radial relationship to wheel 24.

Referring now to FIG. 7, mounting block 64 is shown at an intermediate point in the bead mounting operation, with various parts broken away or omitted. As shown in FIG. 6, roller 66 is engaged with the periphery of the upper rim flange 78 of the wheel and, with roller 66 so engaged, bead roller 68 projects outwardly slightly beyond the periphery of rim flange 78. Bead roller 68 is, at this time, at an elevation slightly above the upper rim flange of the wheel as shown in FIG. 6.

In FIG. 7, the roller mounting block 64 is being rotated along the periphery of upper rim flange 78 in a clockwise direction as indicated by the arrow R. The lower bead 82 of the tire being mounted has a portion 82a which has already been located below the rim 78, and from this already mounted portion passes upwardly across the rim and into overlying relationship with the rim as indicated at the portion 82b. Bead roller 68 engages bead 80 at a point where the bead is above rim flange 78 and, as indicated in FIG. 7, forces the engaged portion of bead 82 outwardly beyond the periphery of rim flange 78. Presser roller 70, is located slightly behind roller 68 with respect to the direction of rotation indicated by the arrow R and, as best seen in FIG. 6, projects downwardly below upper rim flange 78. Thus, roller 70 presses against the inner side of the sidewall of the tire to force the adjacent lower bead 82 downwardly below the rim flange progressively as the roller mounting block 64 is driven around the periphery of rim flange 78.

Figure 2:
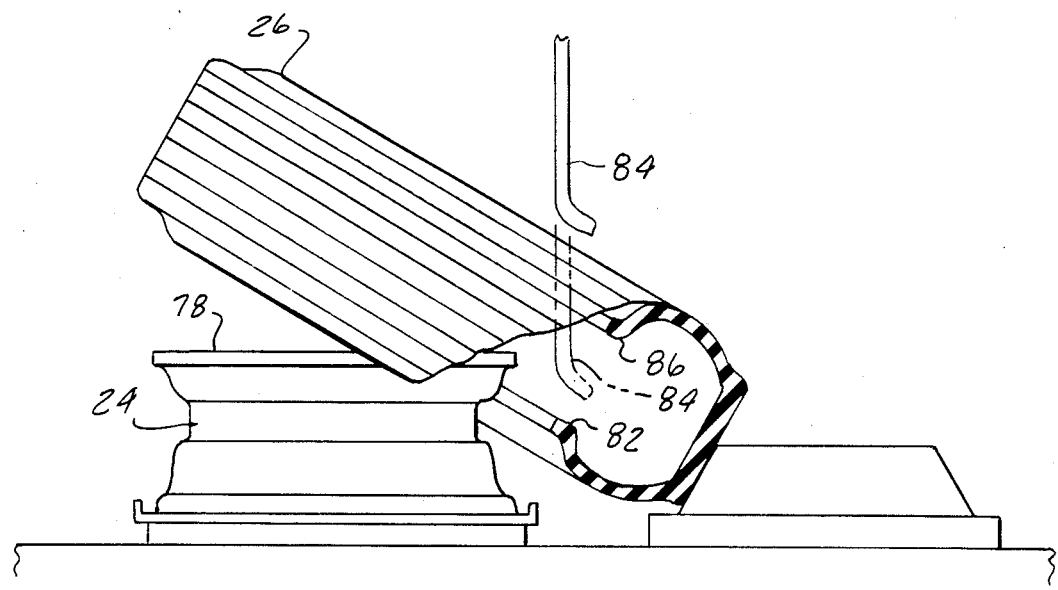
FIG. 2 is a detail side elevational view, partially in section with various parts omitted, of a tire positioned on the wheel as its arrives at the work station.
Figure 3:
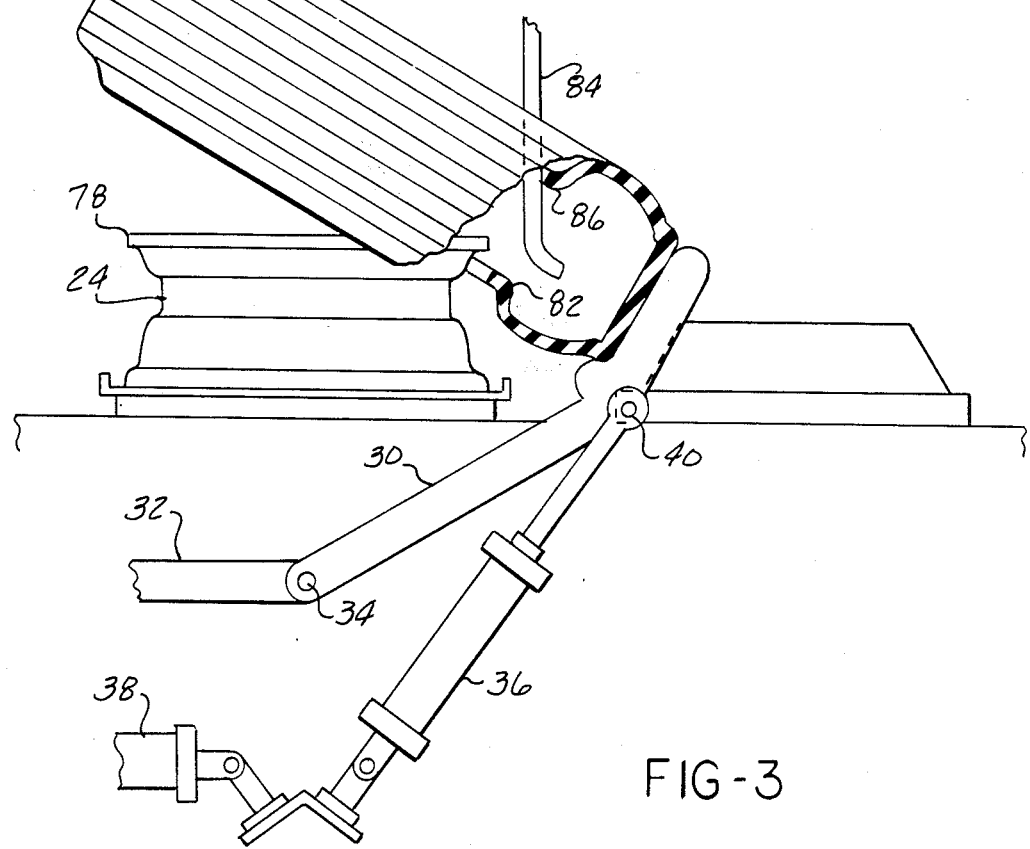
FIG. 3 is a view similar to FIG. 2 showing the tire positioned on the wheel subsequent to its arrival at the work station.

Referring now particularly to FIGS. 2 and 3, a rigid guard finger 84 is fixedly mounted on and projects downwardly from work head 10. When the head is lowered as in FIG. 3, guard finger 84 projects between the uppermost bead 86 of the tire and upper rim flange 78 of the wheel to prevent the upper bead from being inadvertently depressed below the upper rim flange.

The overall operational sequence of the apparatus described above is as follows. Operation of conveyor 14, motor 16 which raises and lowers work head 10, motors 36 and 38 and drive motor 18 is under the control of a suitable conventional control means (not shown), such as a commercially available, programmable controller, for example.

With work head 10 in the elevated position shown in FIG. 1 and arm 22 in the home position, conveyor 14 is operated to advance a wheel 24 with a tire 26 resting on the wheel in the inclined position shown in FIG. 1 to a position in which the axis of the wheel is coaxial with the vertical axis of rotation V of arm 22. The conveyor is then stopped.

Work head 10 is then lowered toward the wheel until it reaches an operating position relative to the wheel at which a clamp pad 88 engages the wheel as shown in FIG. 5. The clamp pad 88 is fixedly mounted to the underside of the work head. The engagement of clamp pad 88 (mostly clearly shown in FIG. 5) with the wheel is cushioned by the engagement of the probe 74 of shock absorber 76 with the upper rim flange 78 of the wheel. During this downward movement, guard finger 84 passes downwardly to a position indicated in broken line in FIG. 2 where the finger is disposed between the upper bead 86 of the tire and upper rim flange 78.

Motor 36 of positioning arm 30 is then actuated to shift the arm, and thus ire 26 upwardly toward wheel 24, as shown in FIG. 3. This positioning of tire 26 assures that the forwardmost portion of the lower bead circumference (with respect to the direction of movement of conveyor 14) is located in underlying relationship with the forwardmost portion of the circumference of upper rim flange 78 of the wheel.

With the head in its lowered operating position, and arm 22 in the home position shown in FIG. 6, rotary drive motor 18 is actuated to commence rotation of arm 22 in a clockwise direction away from its home position as viewed from above. Cam roller 72 thus rolls along the surface of cam 80 (FIG. 5) to permit roller mounting block 64 to move radially inwardly toward the axis of rotation until rim roller 66 engages the upper rim flange 78 of the wheel. As clockwise rotation of arm 22 continues, eventually bead roller 68 will move into engagement with a portion of the lower bead of the tire which projects above upper rim flange 78 and force the engage portion of the bead outwardly as shown in FIG. 7, while presser roller 70 presses the lower sidewall of the tire downwardly to shift the lower bead 82 downwardly below the upper rim 78. This action continues progressively with rotation of arm 22 in a clockwise direction for an angular distance of approximately 330 degrees from the home position, by which time mounting block 64 has reached or passed beyond the location at which the lower bead projected above the rim initially.

The direction of rotation of drive motor 18 is then reversed to return the arm in a counterclockwise direction to its home position. At this time, the motor 36 (FIGS. 1 and 3) is actuated to return the arm 30 to its original retracted position and motor 38 is simultaneously actuated to pivot arm 32 upwardly to push the rear side of the tire 26 upwardly and forwardly relative to the wheel so that the tire is returned to an inclined position relative to the wheel to facilitate mounting of the upper bead at a subsequent station along the line.

When arm 22 is returned to its home position, motor 16 raises head 10 to its elevated rest position.

While one embodiment of the invention has been described in detail, it will be apparent to those skilled in the art that disclosed embodiment may be modified. Therefore, the foregoing description is to be considered exemplary rather than limiting, and the true scope of the invention is that defined in the following claims.

I claim:

1. A single bead tire mounted for mounting one bead only of a tubeless tire upon a wheel having axially spaced radially projecting opposed rim flanges, said mounter comprising a work head mounted for movement along a fixed vertical axis from and to an elevated rest position, an arm mounted at the lower end of said head for rotation about said vertical axis, rotary drive means on said head for driving said arm in rotary oscillation about said vertical axis from and to a normally maintained home position, conveyor means operable when said head and arm are in their respective rest and home positions for forwardly advancing a horizontally disposed wheel with a rearwardly inclined tire having two circumferentially spaced points on its lower bead resting upon the uppermost rim to a work position beneath said head wherein the axis of said wheel is coaxial with said vertical axis, head positioning means operable when said wheel is in said work position to lower said head to an operating position wherein said head is at a predetermined distance above the uppermost rim flange of said wheel, second means operable upon the arrival of said head at said operating position for shifting said tire rearwardly relative to said wheel to position forwardmost portion of the circumference of said lower bead of said tire in underlying relationship with a forwardmost portion of the circumference of said uppermost rim flange, first roller means on said arm located above said uppermost rim flange when said head is in said operative position operable upon rotation of said arm in a first direction from its home position to progressively engage those portions of said lower bead above said uppermost rim and to force the engaged portion of said bead radially outwardly beyond said rim, and second roller means on said arm spaced radially outwardly from said uppermost rim flange for progressively depressing portions of said lower bead adjacent the portion engaged by said first roller means downwardly below said uppermost rim flange as said arm is rotated in said first direction.

2. The invention defined in claim 1 further comprising a roller mounting block mounted on said arm for sliding movement radially of said vertical axis, means biassing said mounting block toward said vertical axis, third roller means on said mounting block operable when said head is in its operating position engagable with the periphery of said uppermost rim to limit movement of said block radially inwardly along said arm, and means mounting said first and second roller means upon said mounting block.

3. The invention defined in claim 2 further comprising fourth roller means mounted on said mounting block, cam means mounted on said head engagable with said fourth roller means as said arm is rotated toward said home position to progressively urge said mounting block radially outwardly from said vertical axis to locate said block at an outer radial end limit of movement on said arm when said arm is in said home position.

4. The invention defined in claim 1 wherein said head positioning means comprises reciprocable drive means for raising and lowering said head, and locating means mounted on said head engageable with said wheel to establish said operating position of said head.

5. The invention defined in claim 1 further comprising a guard on said head projecting downwardly from said head at a location radially outwardly of said second roller means to be located between the uppermost bead of said tire and said forwardmost circumferential portion of said uppermost rim flange when said head is in its operating position.

6. The invention defined in clam 1 wherein said rotary drive means is operable to drive said arm in rotation less than 360 degrees in said first direction from said home position and to then rotate said arm in the opposite direction until said arm has been returned to said home position.

7. The invention defined in claim 6 further comprising third means operable upon the return of said arm to said home position for pushing the rear of said tire upwardly and forwardly of said wheel to locate the tire into a rearwardly inclined position on said wheel wherein the uppermost bead on said tire rests upon two circumferentially spaced points on the uppermost rim of said wheel and the forwardmost portion of the circumference of said tire is at or below the level of the uppermost rim of said wheel.

8. The invention defined in the claim 4 further comprising shock absorber means for cushioning the engagement of said locating means wheel.

* * * * *